May 10, 1932.  J. C. HULL  1,858,090
FRUIT AND VEGETABLE DUSTING APPARATUS
Filed March 29, 1930   2 Sheets-Sheet 2
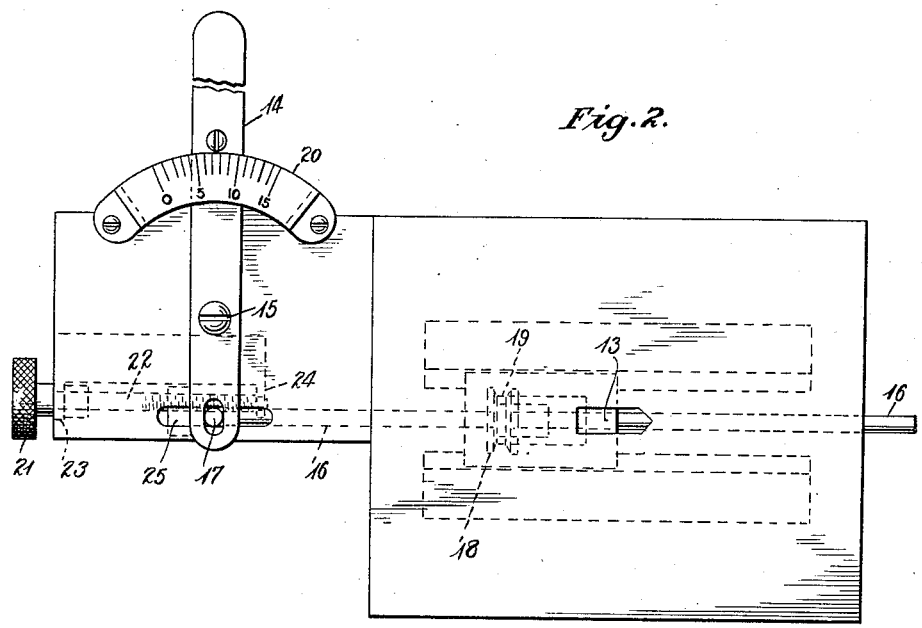
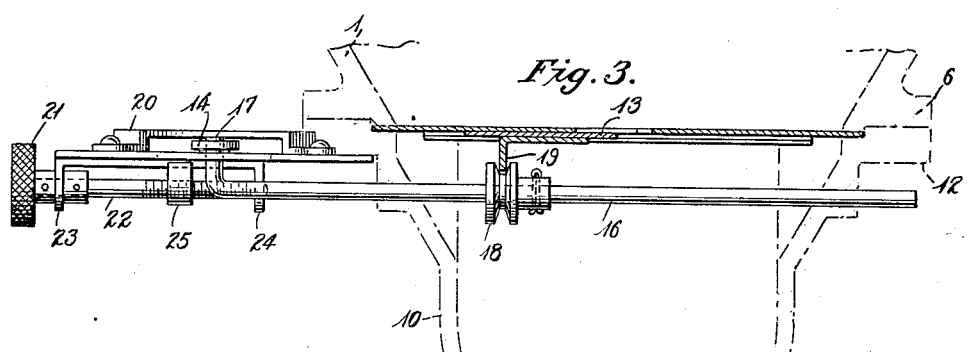
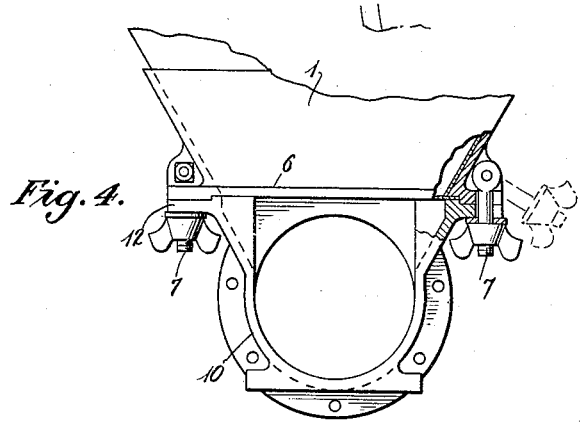
Inventor
John C. Hull
By Bacon & Thomas
Attorneys Patented May 10, 1932

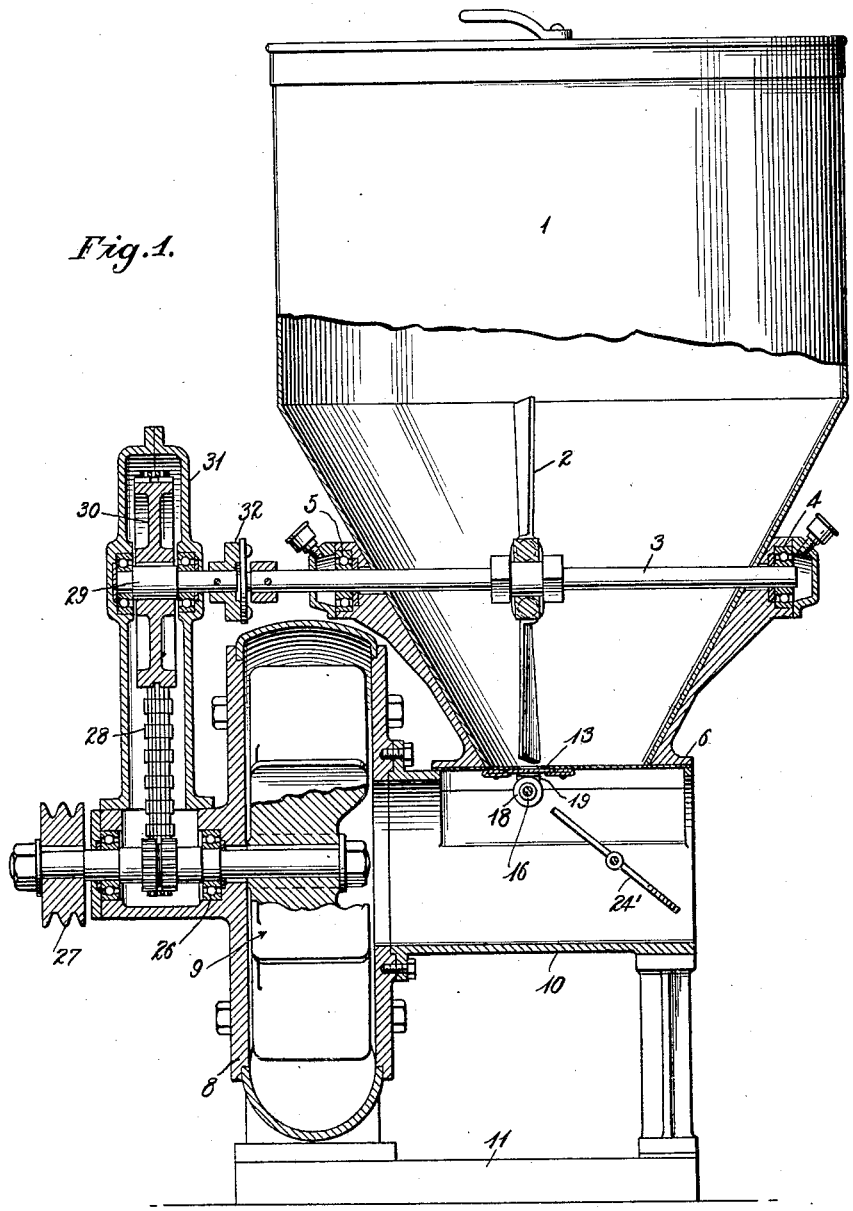

1,858,090

UNITED STATES PATENT OFFICE

JOHN C. HULL, OF GASPORT, NEW YORK, ASSIGNOR TO "FRIEND" MANUFACTURING COMPANY, OF GASPORT, NEW YORK, A CORPORATION

FRUIT AND VEGETABLE DUSTING APPARATUS

Application filed March 29, 1930. Serial No. 440,086.

This invention relates to a duster apparatus and has particular use in the art of dusting vegetation of divers kinds.

The object of the invention is to provide a construction which is extremely simple in nature, compact, light and in which all of the working parts are in actual alignment and completely housed.

A further object of the invention is to provide a construction by which the dusting material is kept in a state of agitation simultaneously and by virtue of the same source of power by which the discharge fan is actuated. A further object of the invention is to provide a construction which may be closely regulated by unskilled help to the end that the ratio of air and dusting material may be selectively varied as well as to provide a variable blast arrangement according to the type of material being treated.

A still further object of the invention is to provide means by which the dusting material in its admixed phase with the air is drawn into the blower mechanism before it is discharged; to provide means by which the hopper may be quickly detached from the blower intake for emptying purposes without disturbing the operating ports of the mechanism.

A further object of the invention is to provide an adjustable stop mechanism for the valve communicating the hopper with the intake in order that this valve may be quickly opened and closed without the necessity of inspecting the same.

There are numerous other advantages and objects of this invention which will be apparent to those skilled in the art from a reading of the following specification and in conjunction with the drawings attached hereto and forming a part hereof, in which Fig. 1 is an elevation partly in section of my invention;

Fig. 2 is a top view of the valve mechanism;

Fig. 3 is a sectional view of the valve mechanism; and

Fig. 4 is a detail view showing the manner of detachably securing the hopper to the intake.

Now referring more particularly to the drawings, the reference numeral 1 indicates a hopper which may be of any desired form. In this hopper there is provided suitable material for the treatment of trees, vegetables and the like. The hopper is provided with a mixer 2 of the propeller type mounted on a mixer shaft 3 which is journaled in suitable roller bearings 4 and 5 at opposite points of the hopper. The lower portion of the hopper is provided with a circumferential rib 6 and swinging turn bolts 7 or any other suitable fasteners for the purpose hereinafter described.

8 is the blower housing having any suitable opening (not shown) and in which is located a blower fan 9. Detachably secured to the housing is an intake 10. The entire mechanism may be supported by a suitable base 11. The intake 10 as shown in Fig. 4 is provided with supporting ledges 12 for receiving portions of the hopper 6 and having slots engaging the securing bolts 7. It is, of course, understood that other types of fastening devices, such as threaded bolts or machine screws, may be used for this purpose. The intake is provided with a suitable slot or opening communicating the hopper therewith. At the bottom of the hopper is provided a feed valve 13. This feed valve is of the sliding type and is opened and closed by a lever 14 pivoted at 15 and connected with the shaft 16 as at 17. Obviously, rocking action of the lever 14 moves the shaft 16 back and forth by virtue of the action of the collar 18 and the portion 19 secured to the slide valve 13. The indicator 20 is provided for determining the quantity of material discharged by a given movement of the lever.

This lever is frequently moved to open or close the valve during ordinary work and always at the end of the rows of vegetables or fruits when making turns, etc. An important object of my invention, therefore, is to provide an adjustable stop mechanism for limiting the opening movement of the valve to any predetermined extent without the necessity of the operator exercising any care or looking at the scale. For this purpose, therefore, my invention comprises a thumb turn 21 having a screw threaded rod 22 journaled as at 23 and 24. Threadedly mounted on this shaft is a stop 25 which moves back and forth when the thumb turn 21 is rotated. By means of the adjustable thumb turn the stopping point may be determined without the necessity of looking at it and there is provided an indicator 20 which can be used for determining the quantity of material discharged so that instructions can be given as to what adjustment is to be made for the various materials.

Within the fan housing intake I provide an air throttle 24' which is operable in any convenient manner. This is for the purpose of regulating the volume of air. As will be apparent, it is sometimes desirable to make a strong or weak blast for distant or nearby branches in tree dusting or a stronger or weaker blast for vegetable dusting. This air throttle valve is therefore provided to accomplish that purpose.

Within the fan housing 8 I provide a fan 9 journaled as at 26 and having fast on the outer end thereof pulley 27 which is of the multi-V type and connected by V-belts to any suitable source of power. A silent chain 28 transmits power from this main shaft to the countershaft 29 situated directly thereabove by virtue of the large gear 30. As will be obvious, therefore, the countershaft is driven at a reduced speed because it is merely desirable that the propeller 2, driven thereby, be slowly revolved for mixing purposes and to prevent an incrusting of the dusting material upon the feed valve 13. It will be observed that the silent chain 27 and its operating connections with the main and countershaft respectively are all enclosed within the housing 31 in order to effectively seal the same from the dusting material and weather conditions.

The countershaft 29 is connected with the mixer shaft 3 by means of a detachable, flexible joint 32. This flexible joint is equipped with approved types of slip studs. Consequently, when the operator loosens the upper thumb turns 7, swings the bolt out of the notches, or removes the screws in the event they are used, and draws the hopper off its foundation for cleaning and removing the materials therefrom, the slip studs on the mixer shaft simply detachably engage the flexible coupling without mechanical difficulties. This is a highly important feature of the invention because by virtue of it the hopper may be removed for emptying or cleaning without disturbing the remaining operating parts of the apparatus.

There are various ways for employing my duster apparatus. For instance, in tree dusting the unit is mounted on a wagon or truck in connection with a gasoline motor to drive the blower fan. However, for vegetable dusting the power is usually taken from the wheels of the vehicle and transmitted through chain and sprocket and gear transmission "step-up" to the V-belts referred to.

As will be apparent from the foregoing description, the dust or treating powder is fed from the hopper into the fan before being discharged onto the tree or vegetable. There are numerous advantages of such a procedure. Thus, by feeding it into the blower the use of an open top hopper is permitted, there being no pressure in the hopper. When the dust is fed into the discharge the hopper cover is necessarily sealed airtight. Moreover, the dust ingredients are discharged with greater uniformity by passing through the fan and if there are any large particles they are completely broken up before leaving the blower fan.

It will be observed that the fan shaft and the countershaft 29 and the mixer shaft 3 and the journals for these parts are all situated in a horizontal plane to thereby obviate stresses and strains and torsion vibrations during the practical usage of the apparatus. It will be also observed that the relative ratio of the dusting material and the air respectively may be readily changed by manipulation of the feed valve and the air throttle. Also the character of the blast may be regulated according to demands by operation of the throttle valve.

From all of the experimental work on sulphur dusts, it has been found that effectiveness depends, in a great measure, on two important points: The first is the finess of the material and the second the lowest possible percentage and kind of conditioner or spreader used to make the sulphur a free-flowing material, which will readily make the proper cloud of dust when applied through ordinary dusting machines. It seems that the finer the sulphur is ground the greater quantities of conditioner or spreader are necessary to accomplish this purpose. Therefore, the increased effectiveness of finely ground material is partly offset by the addition of the conditioning material, especially when lime is used for this purpose.

While a great deal of thought has been given to spreaders, and conditioners, apparently no material has been used without some detrimental effect. Some of the very best authorities who have given this matter serious thought and have tried all of the different dusters available on the market, found they could not make a dust cloud from clear dusting sulphur with these machines and have been in hopes that a dusting machine would be perfected which would handle the real finely divided sulphur clear. Actual use of my apparatus clearly proves that its construction is such that a perfectly uniform feeding of pure sulphur is discharged so that there is a perfect cloud of pure sulphur dust without the necessity of lime or other conditioners and their attendant disadvantages as aforesaid. This is made possible by my machine because of the mixture, in its relation to the hopper and feed valve 13 and the intake manifold and the entire relationship in combination with the fan and its discharge. The agitator or mixer within the hopper performs a beating action as it literally beats any hard lumps into bits right at the discharge from the hopper into the manifold, directly at the point of discharge.

I am aware that any changes in details of construction may be made without departing from the spirit of my invention as expressed in the following claims.

Having thus described my invention, what I claim is:—

1. An apparatus of the character described comprising a blower housing, a hopper for containing treating materials, said hopper being in communication with the blower housing, a fan within the housing for discharging air and treating materials therefrom, a shaft for driving said fan, said shaft being horizontally disposed, a mixer blade within the hopper and a shaft for driving the same, a countershaft, said countershaft deriving its power from the blower fan shaft and a flexible detachable joint operatively connecting the mixer shaft and countershaft and permitting removal of the hopper and its mixer shaft without disturbing the position of the countershaft.

2. An apparatus of the character described comprising a fan housing, a manifold secured to the housing and extending laterally therefrom, an air throttle within the manimold for regulating the quantity of air introduced thereto, a hopper for containing the treating materials, said hopper being detachably secured to the manifold, valvular means between the hopper and manifold for regulating the supply of treating materials from the former to the latter, a fan within the fan housing, a horizontally disposed shaft for driving the same, a countershaft positioned above said fan shaft and located in the same plane thereof, means for transmitting power from the power shaft to the countershaft, a mixer within the hopper, a mixer shaft connected therewith and extending beyond the confines of the hopper, a detachable connection for securing the countershaft to the mixer shaft whereby the mixer is simultaneously driven with the blower fan and means for removing the hopper, mixer and mixer shaft from the manifold.

3. An apparatus of the character described comprising in combination a blower housing, a fan within the housing, a manifold secured to the housing and projecting laterally therefrom, a hopper for containing treating materials mounted upon the manifold, a mixer within the hopper and a horizontally disposed mixer shaft therefor, a power shaft for driving said fan and a countershaft detachably secured to the mixer shaft and a connection between the power shaft and countershaft whereby the fan and mixer respectively are driven at different relative rates of speed for the projection of air and treating materials from the fan housing.

4. A vegetable treating apparatus of the character described comprising a hopper for receiving treating materials, a blower, a valve interposed between the hopper and the blower for opening and closing communication therebetween, means for sliding said valve to open or close the communication between the hopper and the blower and independent means for limiting the opening movement of the valve whereby to predetermine the quantity of materials fed from the hopper to the blower mechanism.

5. Apparatus of the class described comprising a hopper and a blower and an opening communicating the hopper with the blower, a slide valve for opening or closing said opening, lever mechanism for actuating said slide valve and adjustable stop mechanism for limiting the swinging movement of said lever whereby to limit the opening movement of the valve and predetermine the quantity of materials fed from the housing to the hopper.

6. Apparatus of the class described comprising a blower mechanism, a hopper for receiving treating materials mounted upon the blower mechanism, a plate disposed between the lever and blower mechanism and having an opening therein, a slide valve for controlling the size of said opening, a rod extending to the exterior of the blower mechanism and operatively associated with the valve, a swinging lever pivotally supported to said rod, a scale operatively associated with the swinging lever whereby to indicate the amount of swinging movement of the lever and adjustable stop mechanism adapted to limit the inward movement of said rod whereby to predetermine the opening movement of the valve and the quantity of materails discharged from the hopper to the housing.

In testimony whereof I affix my signature.

JOHN C. HULL.